P. HENTSCHKE.
INTERNAL COMBUSTION ENGINE.
APPLICATION FILED JAN. 23, 1920.
1,398,430.
Patented Nov. 29, 1921.
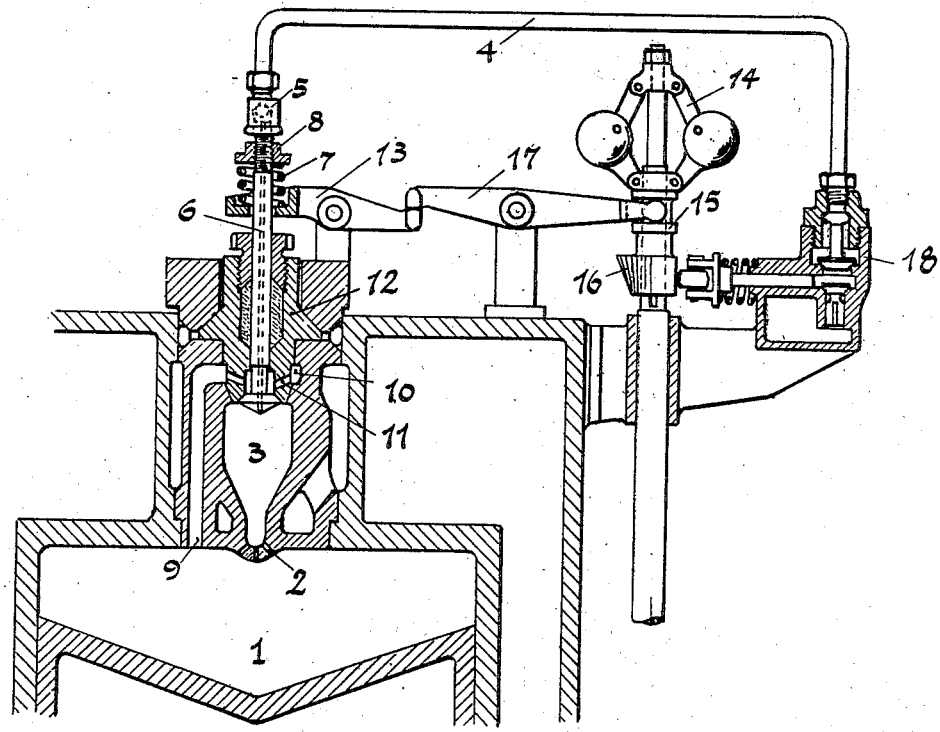
WITNESS:
L. E. Elwell
INVENTOR:
Paul Hentschke

UNITED STATES PATENT OFFICE.

PAUL HENTSCHKE, OF LOS ANGELES, CALIFORNIA.

INTERNAL-COMBUSTION ENGINE.

1,398,430.  Specification of Letters Patent.  Patented Nov. 29, 1921.

Application filed January 23, 1920. Serial No. 353,553.

*To all whom it may concern:*

Be it known that I, PAUL HENTSCHKE, a citizen of Germany, and resident of Los Angeles, in the county of Los Angeles and State of California, have invented new and useful Improvements in Internal-Combustion Engines, of which the following is a specification.

The present invention relates to improvements in internal combustion engines, in which liquid fuel is deposited intermittently in an auxiliary combustion chamber which is in communication with a working cylinder and by the temperature due to the compression of the air charge an explosion and injection of the chamber contents into the cylinder is effected.

The passages through which the cylinder combustion space and said chamber communicate are usually so much restricted that the compression and temperature rise in the chamber is so much delayed that the piston reaches approximately the inner dead center position before the explosion and fuel injection takes place. With permanent passages connecting the cylinder and the chamber it is however not possible to produce the explosion in the chamber at the same desired time under all load conditions of the engine, because a variable amount of liquid fuel changes the temperature of the wall and of the explosive mixture within the chamber to a considerable degree.

The consequence of these temperature variations are preignitions at light load with an unfavorable effect on the running parts of the engine or an unwelcome reduction in the load capacity of the engine, if the area of the passages from the cylinder to the chamber are reduced.

It is the object of the present invention to counteract the described influence of a variable fuel charge to the auxiliary combustion chamber on the time of the explosion in said chamber of an engine of the described order. This object, generally speaking, is accomplished by a mechanical control of part, or of all of the passages from the cylinder to the chamber, in such a manner that with a similar amount of liquid fuel intermittently deposited in the chamber a similar amount of compressed air is admitted from the cylinder to the chamber. The amount of fuel delivered by the fuel pump of an engine depends primarily on the engine load, secondarily on the position of a hand control, or a device operative by speed changes of the engine; it is therefore possible to accomplish the object of my invention automatically by providing a connection between the above mentioned means for controlling of the air passages from the cylinder to the auxiliary combustion chamber with the means used for controlling of the amount of fuel delivered to the chamber, or as the case may be of the speed of the engine. Said connection can either be made directly by common mechanical elements as levers, rods or eccentrics or in large engines by the application of a pump and a fluid as a power transmitting medium.

The accompanying drawings show some of several ways of accomplishing the object of the present invention, which though differing in the arrangements of the details are principally related to one another.

The figure represents a longitudinal section through the working cylinder and piston of an internal combustion engine of the described kind, and an arrangement of permanent and controllable passages from the cylinder to an auxiliary combustion chamber.

The following action takes place.

Fresh air, which is charged into the cylinder 1 on the suction stroke (or in the lower dead center position of the piston in a two cycle engine) is compressed by the inward movement of the piston. During the compression stroke a part of the compressed air will pass from the cylinder 1 through holes 2 into the chamber 3, into which also a charge of liquid fuel is delivered during the said compression stroke by a pump 18 through pipe 4, check valve 5 and hollow stem of valve 6. The pressure rise within the chamber 3 is considerably smaller than in the cylinder 1 due to sufficient restriction in the holes 2, fuel vapors with a certain amount of compressed air will, without reaching a condition of self ignition, form an explosive mixture in the chamber 3.

As soon as the pressure in the cylinder 1, due to the forward movement of the piston to a position near inner dead venter, rises high enough to overcome the force of spring 7, which acts by means of collar 8 on valve 6, then some compressed and therefore heated air will pass through the open valve 6, to the top portion of chamber 3 by way of the passage 9, ring groove 10, and openings 11 in the plug 12. This instantly brings the pressure and temperature of the explosive mixture within chamber 3 to self ignition; the following explosion and pressure-rise brings the valve 6 upon its seat, and the portion of the chamber-contents richest in fuel are violently expelled into the cylinder 1, where the fuel-mist is subjected to a high temperature and burns with a receding piston, so that no considerable pressure-rise above compression-pressure is experienced.

It can be seen that by the adjustment of collar 8 and tension of spring 7, the time of the explosion in chamber 3 and the injection of the fuel-air mixture into the cylinder 1 can be so adjusted that the combustion in the cylinder 1 takes a desired course. However any change of load in the engine, which necessitates a change of the amount of fuel delivered to the chamber 3, would also change the temperature of the inside wall of the said chamber 3 in a direct relation to the amount of fuel delivered; a larger amount of fuel will lower the temperature of the wall of chamber 3 and also of the fuel-air mixture to an even larger measure, so that the explosion in the chamber 3 and the fuel injection into the cylinder 1 is effected too late for an efficient combustion. A fresh adjustment of collar 8 and a sufficient release of the tension of spring 7 will allow more compressed and hot air to go through passage 9 to the top of chamber 3, therefore will counteract the cooling effect of the larger amount of fuel.

This readjustment of spring 7 is made in the arrangement shown in an automatic way by the movement of lever 13, which serves as a support for the lower end of spring 7. Lever 13 can be operated by the usual means for the control of the engine speed and also the control of the fuel pump 18. The said pump 18 is operated in the cycle of the engine by a variable stroke cam 16, to deliver an intermittent charge of liquid fuel to the chamber 3. The said fuel-charge is varied through the action of the governor 14, and it will be observed that the governor 14 by its action on sleeve 15 and cam 16 alters the amount of fuel delivered by the pump 18, the said governor 14 also alters the position of lever 13 by means of lever 17, and therefore the tension of spring 7.

A larger amount of fuel delivered through pipe 4 to chamber 3 is accompanied by a release of the spring 7, a smaller amount of fuel is accompanied by a compression of the said spring 7, in other words by a correspondingly larger or smaller air-charge through passage 9 to the chamber 3.

It will be observed that the present invention also facilitates the starting operation of the engine by supplying a surplus of compressed air from the cylinder 1 to the chamber 3, at a time when a low compression in the cylinder with the cold walls in the chamber are opposed to the first heat producing explosion in the chamber 3. The operation of starting the cold engine can be facilitated to any desired degree by a further release of the said spring 7, till the cylinder 1 and chamber 3 have attained their normal operating temperature.

Chamber 3 is preferably water cooled for the object of keeping the temperature in the heavy portion of same within an allowable limit, while the vital portions of the said chamber 3, near the seat of plug 12 and near the passages 2 are more effectively cooled.

Fuel passing through the hollow stem of valve 6 is resorted to in order to keep said valve 6 at a lower temperature, while at the same time the advantage of preheating of the liquid fuel charge is gained.

A charge of air, entering the chamber through holes 2 during the compression stroke of the piston, creates a mixture of air, fuel vapors, and liquid fuel, while a second charge of compressed air from the cylinder is delivered back of the fuel-air mixture through passage 9 and valve 6. This latter air charge still further compresses the mixture and drives the larger portion of the said mixture to the lower half of the chamber 3, from whence it is expelled into the cylinder by the force of the explosion created by the additional compression; the pure air remaining in the top portion of the chamber 3 during the latter part of the combustion and expansion period in the cylinder serves as a scavenger in the chamber.

It is understood that the cylinder 1 may be cooled in the usual manner by the introduction of a cooling medium preferably water into the cooling jacket as indicated. It is further understood the chamber 3, the plug 12 and a top flange positioned on the said plug 12 are secured to the cylinder 1 by a suitable means.

Various modifications may be made without departing from the spirit of my invention as claimed.

I claim:

1. In an internal combustion engine of the class described, an expansion cylinder in communication with an auxiliary combustion cylinder through a predetermined number of restricted holes; a supply means adapted to charge the liquid fuel into the auxiliary combustion chamber in sequence with the cycle of the engine; a passage for compressed air leading from the said expansion cylinder into the said auxiliary combustion chamber, adapted to be intercepted by an automatically timed valve means; a mechanical means, adapted to vary the resistance through the said passage to the flow of compressed air from the expansion cylinder into the auxiliary combustion chamber in reversed order to the amount of liquid fuel charged into the auxiliary combustion chamber for variable loads on the engine.

2. In a pneumatic fuel injection means in combination with an internal combustion engine and an auxiliary combustion chamber; a diametrically tapering space integral with the said auxiliary combustion chamber; a predetermined area of holes, adapted to pass from the cylinder of the said engine into the diametrically tapering space, to maintain a flow of air into the said auxiliary combustion chamber during the compression stroke, and restricted to prevent preignition; a liquid fuel charging means, adapted to deliver fuel to the said diametrically tapering space, through the said auxiliary combustion chamber, against the restricted airflow from the said engine cylinder through the said predetermined area of holes, to create a preliminary fuel-air mixture; a secondary air delivery means, adapted to pass from the engine cylinder into the said fuel injection means, to admit air under pressure and to expel by explosion, the fuel and air charge from the auxiliary combustion chamber, into the engine cylinder; a pure air retainer, adapted to scavenge the said auxiliary combustion chamber, for the following charge of liquid fuel; a water jacket positioned around the diametrically tapering space, adapted to absorb the heat therefrom; an expanded shell integral with the auxiliary combustion chamber, adapted to retain a high temperature, as set forth.

3. In a fuel-air atomizing and charging means communicating with the cylinder of an internal combustion engine; a predetermined passage-area therebetween, adapted to admit a predetermined charge of air therethrough during the compression stroke of the said engine; a liquid-fuel charging means, adapted to deliver fuel into the said fuel-air atomizing and charging means, to create a preliminary fuel-air mixture with the said charge of air; a compressed air delivery means leading from the engine cylinder into the said fuel-air atomizing and charging means, adapted to raise the pressure and temperature therein with compressed air at a time determined in accordance to the fuel charge above the self ignition degree, to expel by explosion the contents thereof into the said cylinder; a temperature controlling means integral with the said liquid-fuel charging means and the compressed air delivery means, adapted to preheat the said fuel and to cool the said compressed air; a temperature controlling means integral with the body of the said auxiliary combustion chamber, adapted to hold a high temperature in the upper portion thereof and a low temperature in the lower portion thereof, as set forth.

PAUL HENTSCHKE.